United States Patent
Wübbels

(10) Patent No.: US 6,826,897 B2
(45) Date of Patent: Dec. 7, 2004

(54) HARVESTER HEADER FOR MOWING STALK-LIKE CROP

(75) Inventor: Richard Wübbels, Rhede (DE)

(73) Assignee: Maschinenfabrik Kemper GmbH & Co, KG, Stadtlohn (DE)

(*) Notice: Subject to any disclaimer, the term of this patent is extended or adjusted under 35 U.S.C. 154(b) by 0 days.

(21) Appl. No.: 10/314,020

(22) Filed: Dec. 4, 2002

(65) Prior Publication Data

US 2003/0101703 A1 Jun. 5, 2003

(30) Foreign Application Priority Data

Dec. 5, 2001 (DE) .......................................... 101 59 729
May 18, 2002 (DE) .......................................... 102 22 310

(51) Int. Cl.[7] .............................................. A01D 45/02
(52) U.S. Cl. ........................................................ 56/51
(58) Field of Search .............................. 56/51, 14.7, 60

(56) References Cited

U.S. PATENT DOCUMENTS

| | | | | |
|---|---|---|---|---|
| 1,901,099 A | * | 3/1933 | Hale | 56/102 |
| 3,736,733 A | | 6/1973 | Fell et al. | 56/98 |
| 4,236,369 A | * | 12/1980 | Decoene | 56/60 |
| 4,594,842 A | * | 6/1986 | Wolters et al. | 56/94 |
| 5,237,804 A | * | 8/1993 | Bertling | 56/60 |
| 5,722,225 A | | 3/1998 | Wuebbels et al. | 56/60 |
| 5,852,922 A | * | 12/1998 | Over Behrens et al. | 56/14.7 |
| 6,430,907 B2 | * | 8/2002 | Wolters et al. | 56/64 |

FOREIGN PATENT DOCUMENTS

| | | |
|---|---|---|
| DE | 39 09 754 A | 10/1989 |
| DE | 199 39 168 | 2/2001 |
| DE | 199 53 521 A | 5/2001 |
| DE | 101 03 595 | 6/2002 |
| EP | 0 099 527 A | 7/1983 |
| EP | 0 508 189 A | 5/1995 |
| EP | 0 760 200 A | 6/1996 |
| EP | 0 824 856 A | 8/1997 |
| EP | 1 010 363 A | 10/1999 |
| EP | 1 008 291 A | 11/1999 |
| EP | 1 234 494 A | 12/2003 |
| GB | 2 012 154 A | 6/1982 |

* cited by examiner

Primary Examiner—Robert E. Pezzuto
Assistant Examiner—Alicia Torres

(57) ABSTRACT

A header of a crop harvester is equipped with a plurality of side-by-side arranged intake and mowing drums, including two adjacent intake and mowing drums at one side of a crop outlet of the header, which rotate such that the one closest the outlet rotates to deliver crop first inward and then to the rear directly into a conveying channel located at the rear of the closest intake and mowing drum, while the other drum rotates to deliver crop first outward and then to the rear. A second crop conveying channel is located for receiving the crop harvested by the outer intake and mowing drums and for keeping this crop separate from that harvested by the inner intake and mowing drum until the separate streams merge at the crop outlet after being elevated there by a slope conveyor provided for lifting the crop from the working height of intake and cutting drums to the crop outlet, which is at a height above the working height.

8 Claims, 4 Drawing Sheets

HARVESTER HEADER FOR MOWING STALK-LIKE CROP

FIELD OF THE INVENTION

The invention concerns a harvester header, for mowing stalk-like crop, equipped with several intake and mowing drums arranged in side-by-side relationship to each other across the width of the header, of which, an inner pair of intake and mowing drums is driven for moving cut crop first inward and then to the rear, and a second pair of intake and mowing drums respectively adjoining the inner pair are driven for moving cut crop first outward and then to the rear. A channel for the crop harvested by the inner and second pairs of intake and mowing drums is conveyed to an intake channel containing feed rolls for delivering the crop to a chopper drum of the harvester. A deflecting conveying unit with an axis of rotation inclined slightly forward bridges the vertical distance between the operating plane of the intake and mowing drums and the plane of the intake channel of the header.

BACKGROUND OF THE INVENTION

DE 39 09 754 A describes a harvesting implement for the harvesting of cereal forage in which four rotating cutting disks are arranged in side-by-side relationship to each other. The cut crop is taken over at their rear sides by a transverse screw conveyor. Each of the cutting disks rotates in the same direction on both sides of the longitudinal center plane so that the crop is conveyed at first outward and then to the rear.

DE 199 53 521 A shows a cutting and conveying arrangement for stalk-like cereal crop that is provided with four cutting and conveying rotors arranged in side-by-side relationship to each other. The crop taken up by the cutting and conveying rotors is extracted by rotating clean-out devices from the pocket-shaped recesses of the cutting and conveying rotors. A transverse screw conveyor transports the crop to the center of the machine from which it is conducted to a chopper drum of a forage harvester. Intermediate conveying rotors are arranged between the outer cutting and conveying rotors and the transverse screw conveyor, whose enveloping circle overlaps the enveloping circle of the rotating clean-out devices.

EP 0 508 189 A describes a machine for the mowing of corn in which two intake and mowing drums are arranged on each side of the center plane. The inner intake and mowing drums rotate in such a way that the crop is first conveyed outward and then to the rear. Here the outer intake and mowing drums rotate in the opposite direction.

U.S. Pat. No. 5,722,225 discloses a header for the mowing of stalk-like harvested crop in which several intake and mowing drums are distributed over the operating width. The crop is transported inward on the rear side of the intake and mowing drums along the rear wall. Except for the outer intake and mowing drums, each of the intake and mowing drums on both sides of the longitudinal center plane rotate in the same direction so that the crop is conveyed first toward the outside and then to the rear. This direction of rotation permits the use of transverse conveying drums in the valley region of adjacent intake and mowing drums. Here, each of the outermost intake and mowing drums rotates in the opposite direction: with these, the crop is conveyed first in the inward direction and then to the rear. The harvested crop is conducted by transverse conveying drums to the inner intake and mowing drums from the intake and mowing drums arranged further outward. They transfer this crop, to which the crop harvested by themselves is added, to the slope conveyor drums that convey it upward and to the rear into the intake channel of the forage harvester. In the region behind the inner intake and mowing drums, problems in the conveying may arise.

The intake and mowing drums of EP 1 008 291 A rotate in the same direction as those in U.S. Pat. No. 5,722,225. However, the transverse conveying is accomplished behind the intake and mowing drums by an independent transverse conveyor that is separated from the intake and mowing drums.

Finally, FIG. 10 of GB 2 012 154 A, regarded as establishing the class, shows a corn harvesting machine in which two intake drums are arranged on each side of the longitudinal center plane. The outer intake drums rotate toward the inside. At their rear sides, the crop is conveyed by a belt conveyor inward towards the center of the machine and then deflected into the inlet channel of a chopper. The belt conveyor also conveys the material taken up by the inner intake drum in the inward direction. Thereby, the material is deflected from its original flow direction to the rear due to the take-over by the belt conveyor, and it is deflected first inward and then into the intake channel. Furthermore, the belt conveyor must absorb, as a transverse conveyor, the flow of crop from both intake drums.

The machine disclosed in U.S. Pat. No. 5,722,225 has the advantage of a short configuration due to the fact that the transverse conveying drums interact with the intake and mowing drums so that the forage harvester that carries it need absorb only a relatively small amount of torque. The machines, according to DE 39 09 754 A, DE 199 53 521 A, EP 1 008 291 A and GB 2 012 154 A, are considerably longer due to the transverse conveyor that operates independently of the intake and mowing drums and apply a greater load to the forage harvester. The configuration according to EP 0 508 189 A is appropriate to only a limited degree for operating widths that can be attained by the aforementioned machines.

The problem underlying the invention is seen in the need to improve the flow of the crop in a compact machine for the mowing of stalk-like crop.

SUMMARY OF THE INVENTION

According to the present invention, there is provided a crop harvester header equipped with a plurality of intake and mowing drums mounted in side-by-side relationship to each other across the width of the header, with there being a crop conveying channel located downstream of, and at an approximate straight line to, an inner pair of intake and mowing drums located on opposite sides of a longitudinal center plane of the header so that crop harvested by the inner pair of intake and mowing drums can be conveyed generally without any deflection through the channel.

The invention concerns a header, as described in the immediately preceding paragraph, which operates such that the second intake and mowing drum is brought into rotation in such a way that its side preceding in the direction of operation moves to the outside. The harvested crop is thereby conveyed by the second intake and mowing arrangement first to the outside and then to the rear. In contrast thereto, the inner intake and mowing drum moves crop in the opposite direction. The crop harvested by it is thereby conveyed first to the inside and then to the rear. Following this, the crop from both intake and mowing drums is conveyed by a deflecting conveying unit having an axis of rotation inclined slightly forward, upward, and to the rear into the intake channel of the following chopper drum. The deflecting conveying unit is preferably a slope conveyor drum that is preferably provided with conveyor disks arranged one above the other about whose circumference drivers are distributed. The use of an endless conveyor equipped with tensioning means (chains or belts) would also be conceivable as a deflecting conveying unit.

In this way, the first inner intake and mowing drum does not operate as a conveyor for the crop coming in from further outward due to its direction of rotation. The machine according to the invention has a crop flow that is considerably improved. Due to the direction of rotation of the second intake and mowing drum, the advantageous transverse conveying can be maintained with the use of transverse conveying drums, as they are known from U.S. Pat. No. 5,722,225. During reverse operation for the removal of a jam, the inner intake and mowing drums operate considerably more aggressively since they always operate along in the corresponding direction of conveying.

Preferably, the crop made available by the second intake and mowing arrangement is conveyed through a conveying channel in the direction of the intake channel of the following chopper drum. On the basis of the directions of rotation selected, this conveying channel is independent of the inner intake and mowing drums arranged ahead of it and is separated from it, for example, by a wall.

In this conveying channel, a driven transverse conveying arrangement is preferably arranged, which conveys the crop from the second intake and mowing arrangement to the deflecting conveying unit. The transverse conveying arrangement is preferably a transverse conveying drum with an approximately vertical axis of rotation, although the use of an endless conveyor equipped with tensioning means (chains or belts) would be possible. Since the transverse conveying arrangement does not transfer the flow of crop to the inner intake and mowing drums and need not convey any crop from it, it can be attached at a position in which an optimal transfer of crop from the second intake and mowing drum to the transverse conveying arrangement is possible. On the basis of the direction of rotation of the drive of the inner intake and mowing drums, according to the invention, the transfer of the crop from the transverse conveying drums to the deflecting conveying unit can be configured optimally, since in this region, no plants are coming in from the front. The deflecting conveying unit takes over the crop directly from the transverse conveying arrangement, that is, without any assistance from the inner intake and mowing drum. It would also be conceivable to integrate the transverse conveying arrangement and the deflecting conveying unit into a single conveyor. This can be configured as a single, relatively large conveying drum or as an endless conveyor. Most appropriately, the driven elements of the transverse conveying arrangement are arranged behind the conveying channel in the direction of operation. In this embodiment, the conveying channel is bordered to the front by a wall, on whose opposite side the inner intake and mowing drums are arranged. A reverse arrangement would also be conceivable in which the driven elements of the transverse conveying arrangement are located ahead of the conveying channel.

The deflecting conveying unit is also used preferably for the transport of the crop from the inner intake and mowing drums. It takes over the crop preferably downstream of the take-over region of the crop from the second intake and mowing drums (as a rule, from the transverse conveying arrangement), so that the two transfer regions to the deflecting conveying unit are independent of each other.

In order to increase the operating width of the machine, an obvious solution is to arrange an outer intake and mowing drum at the outside that is driven in such a way that the crop is conveyed first inward and then to the rear. There, the flow of the crop is combined with the flow of the crop of an intake and mowing drum arranged further inward that is driven in the opposite direction of rotation. In addition, or alternatively, the operating width can be increased by further intake and mowing drums that are offset to the outside relative to the second intake and mowing drum, and that can be driven in such a way that they convey cut harvested crop first to the outside and then to the rear. The crop is conveyed through the rear sides of the intake and mowing drums to the inside. In the valley region between intake and mowing drums driven in this way, a transverse conveying drum may be arranged.

In order to obtain enough space behind the inner intake and mowing drum in the direction of operation for the conveying channel and the associated transverse conveying arrangement, an obvious solution is to offset the inner intake and mowing drum to the front, relative to the forward direction of operation, relative to the second intake and mowing drum. Thereby, long plants can be better deposited in the center of the header which reduces the losses of ears.

Finally, it remains to be noted that the header is preferably configured symmetrically about the longitudinal center plane. Then, two inner intake and mowing drums are arranged in the center of the machine that take in plants between themselves. Plants that stand exactly between the two inner intake and mowing drums are cut and conveyed without any problem. The losses of plants and ears in the center of the machine are lower, since the two central plant rows are not deflected as strongly as in the state of the art. It should be noted that in certain embodiments, the inner intake and mowing drums may be offset to the side as far as desired relative to the longitudinal center plane of the machine, particularly if the machine is equipped with an uneven number of intake and mowing drums.

BRIEF DESCRIPTION OF THE DRAWINGS

The drawings show three embodiments of the invention that are described in greater detail in the following.

DESCRIPTION OF THE PREFERRED EMBODIMENT

Figure 1:
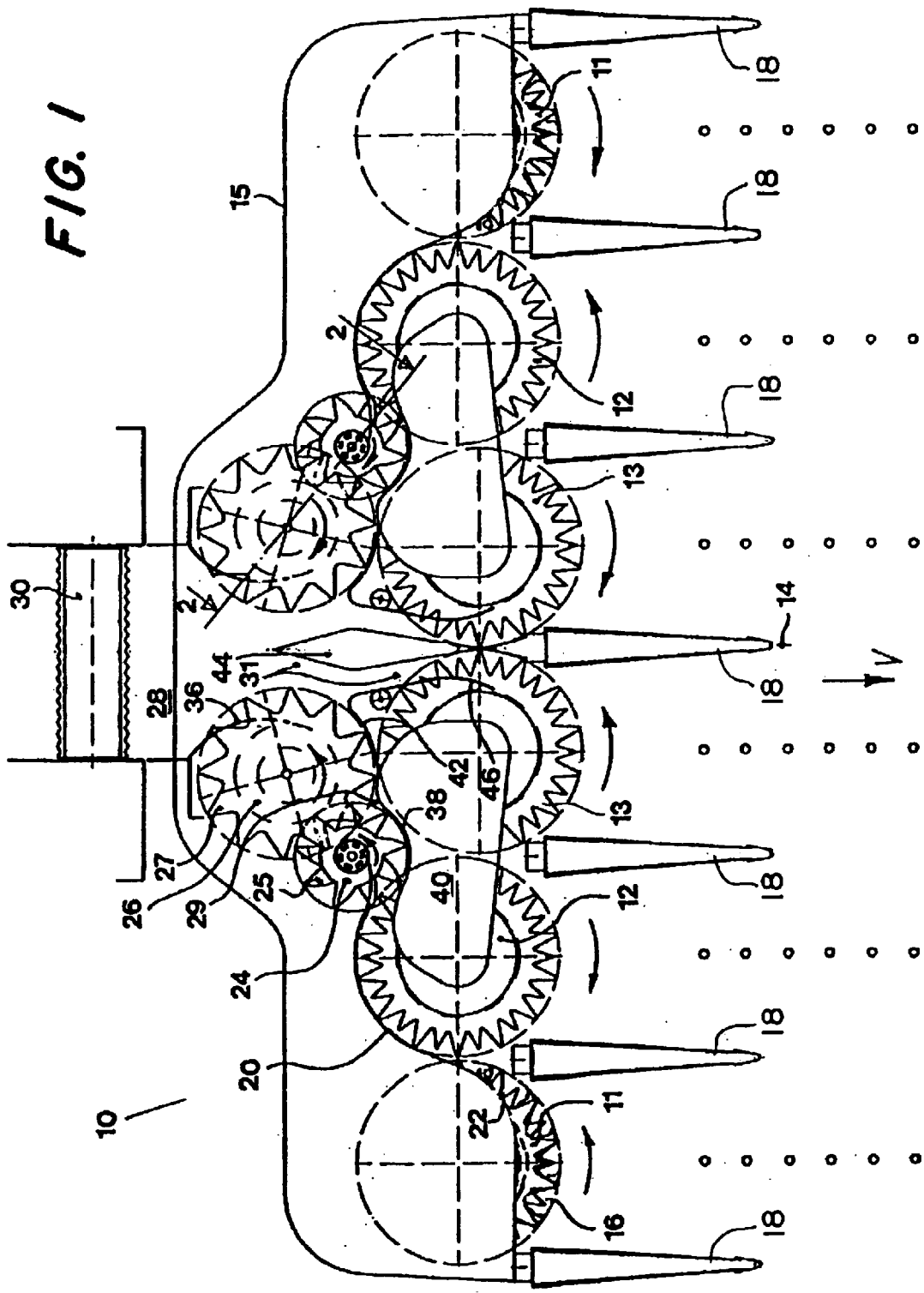
FIG. 1 is a plan view of a crop harvester header for the mowing of stalk-like crop constructed in accordance with the present invention.

The crop harvester shown in FIG. 1 includes a header 10 for the mowing of stalk-like crop equipped with six intake and mowing drums 11, 12, 13 used as intake and mowing arrangements that are disposed symmetrically about a longitudinal center plane 14 of the header 10. On each side of the longitudinal center plane 14, there are three intake and mowing drums 11, 12, 13. The header 10 includes a frame 15. In the following, the directions, such as ahead, outer, inner, behind, and to the side, are relative to the direction of operation V of the header 10.

The intake and mowing drums 11, 12, 13 operate independently of rows and are composed of a lower cutting disk 16 that rotates about an approximately vertical axis, and conveying disks arranged coaxially above these, whose circumference is provided with pocket-shaped recesses. The cutting disks 16 separate the upper parts of the crop from the stubble remaining in the ground. The stalks of the harvested crop, composed particularly of corn, are taken up in the pocket-shaped recesses of the conveying discs and retained there. In place of all or some of the rotating intake and mowing drums shown in the drawing, intake and mowing arrangements can also be used that are based on endless conveyors.

Stalk dividers 18 are arranged ahead of the intake and mowing drums 11, 12, 13. Between the rear side of the intake and mowing drums 11, 12, 13 and a rear wall 20 of the header 10, that conforms in its shape with the intake and mowing drums 12, a transverse conveying channel is formed through which the crop harvested by the intake and mowing drums 11, 12, 13 is transported sideways to the center of the machine 10.

The two outer intake and mowing drums 11 are brought into rotation in such a way that the harvested crop is conveyed at first to the side in the direction towards the longitudinal center plane 14 and then to the rear opposite to the direction of operation V of the machine 10. There, the harvested crop is taken over by the next inner intake and mowing drum 12. This intake and mowing drum 12 rotates in the opposite direction from that of the adjoining outer intake and mowing drum 11 so that it conveys the harvested crop first to the side towards the outside and subsequently to the rear. On its side facing the outer intake and mowing drum 11, the intake and mowing drum 12 takes over the harvested crop from the outer intake and mowing drum 11. A crop take-out or stripper device 22, that is composed of sheet metal parts, that intrude into the enveloping circle of the outer intake and mowing drums 11, extract the harvested crop from the pocket-shaped recesses which act to transfer the harvested crop to the intake and mowing drum 12 along whose rear side the harvested crop is conducted inward towards the longitudinal center plane 14 in interaction with the rear wall 20.

Following this, the crop is extracted by a take-out or stripper device (not shown) from the pocket-shaped recesses of the intake and mowing drum 12 and taken over by a rotating transverse conveying drum 24 arranged behind the drum 12 and whose axis of rotation is approximately vertical. The transverse conveying drum 24 is composed of a cylindrical body with conveying disks fastened to it, one above another, with each disk being provided with drivers 25 arranged about its circumference for the conveying of crop. The drivers 25 are provided with a surface leading in the direction of rotation which is curved opposite to the direction of rotation. Therefore, the leading surface has a rejecting conveying performance or characteristic. In place of the tooth-shaped drivers 25, fingers could also be used. The upstream region of the transverse conveying drum 24 penetrates through slots in the rear wall 20. The rear wall 20 ends in the vicinity of the cylindrical body of the transverse conveying drum 24.

The enveloping circle of the transverse conveying drum 24 overlaps the enveloping circle of the intake and mowing drum 12. The transverse conveying drum 24 conveys the crop along a fixed wall 38 (or a wall movable against a force) that lies ahead of it in the direction of operation V, the wall 38 being arranged underneath a covering 40 that covers the next outer intake and mowing drum 12 and the inner intake and mowing drum 13. Since there is no covering (center table) between the two inner intake and mowing drums 13 due to the plants coming in at that point, no plants can remain lying on this center table in an undesirable manner that would lead to losses.

The crop is then taken over by a slope conveyor drum 26 used as a deflecting conveying unit that is composed of a cylindrical body with toothed conveying disks arranged one above another. The axis of rotation of each slope conveyor drum 26 is inclined in the forward direction, the drums 26 acting to first convey the harvested crop sideways to the inside, and then upward to the rear into vertically-spaced intake rolls 30 arranged across the intake channel 28 of the forage harvester. The enveloping circle of the transverse conveying drum 24 and the enveloping circle of the slope conveyor drum 26 overlap in order to optimize the transfer of the crop. The result here is that the slope conveyor drums 26 take over the harvested crop from the transverse conveying drums 24, where separate take-out or stripper devices for the transverse conveying drums 24 are not required.

The slope conveyor drums 26 each interact with a fixed wall 42, arranged ahead of them (or a wall that can be moved against a force), which is formed by an element fastened to the bottom of the header 10 that also forms a crop take-out or stripper device 46 for the inner intake and mowing drums 13. A crop take-out or stripper device 36 extracts the crop on the output side of each of the slope conveyor drums 26. The deflecting of the harvested crop to the rear by the slope conveyor drums 26 can be simplified by arc-shaped deflecting skids that are arranged at the bottom of the header 10 between the slope conveyor drums 26.

For the transport of the crop, the slope conveyor drums 26 are each equipped with drivers 27. The surfaces of the drivers of the slope conveyor drums 26 that are leading in the direction of rotation are arranged approximately radially, resulting in an aggressive conveying performance. In place of the tooth-shaped drivers 27, fingers could also be used. A control of the drivers 25 and/or 27 is also conceivable that has the effect of a radial shifting and/or azimuthal rotation of the drivers 25, 27, in order to improve the conveying of the crop. Thereby, the transverse conveying drum 24 and the slope conveying drum 26 form a conveying channel 29 for the crop harvested by the outer intake and mowing drums 11, 12, which are separated from the inner intake and mowing drums 13 and are independent of these. In order to be able to attain this conveying channel 29, without having to deflect the flow of the crop in it in an undesirable way and without having to increase the length of the header 10 as measured in the direction of operation V significantly, at least in the region of the center and outer intake mowing drums 11, 12, the axes of rotation of the inner intake and mowing drums 13 are offset to the front in the direction of operation V relative to the other intake and mowing drums 11, 12. The drive of the intake and mowing drums 11, 12, 13, of the transverse conveying drums 24 and of the slope conveyor drums 26 is performed by means of appropriate gearboxes from the forage harvester.

The inner intake and mowing drums 13 rotate in the opposite direction from the next outer intake and mowing drums 12 so that they convey the crop at first inward in the direction towards the longitudinal center plane 14 of the header 10 and then to the rear when the header 10 is moved over a field in the direction of operation V during the harvesting process. The crop harvested by the inner intake and mowing drums 13 is extracted from them by the take-out or stripper devices 46, flows off without any deflection through a part of a channel 31 located between a somewhat lozenge-shaped central guide element 44 arranged on the bottom of the header 10 and the take-out device 46, and is combined to the side alongside and slightly ahead of the transverse conveying drum 26 with the flow of the crop in the conveying channel 29 that originated from the outer intake and mowing drums 11, 12. Following this, the combined flow of the crop flows further in a straight line through the part of the channel 31 that is located between the guide element 44 and the slope conveyor drum 26 into the intake channel of the forage harvester, where it is chopped and deposited into a wagon.

Figure 2:
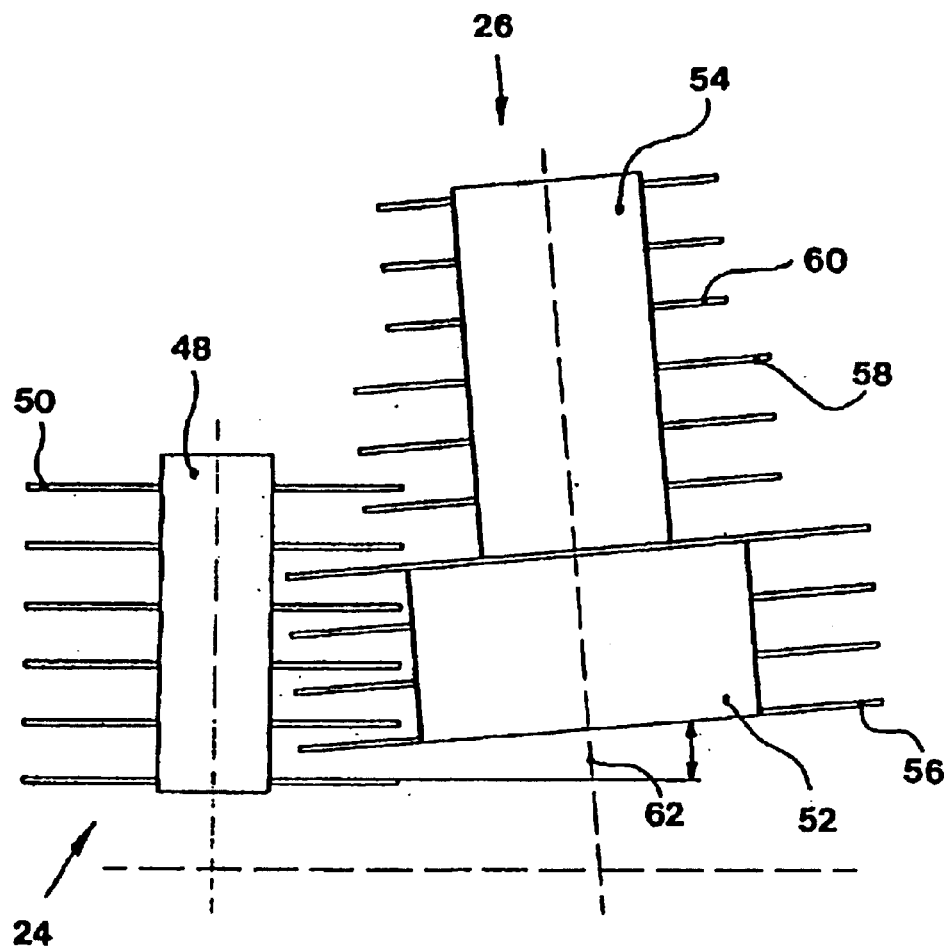
FIG. 2 is a vertical cross section taken along line 2—2 of the header of FIG. 1.

The enveloping circles of the conveying disks of the transverse conveying drum 24 and the enveloping circles of the conveying disks of the slope conveyor drum 26 overlap so that the latter extracts the crop from the transverse conveying drum 24. A separate crop take-out or stripper device for the transverse conveying drum 24 can be eliminated. The cross section through the transverse conveying drum 24 and the slope conveying drum 26, shown in FIG. 2, clarifies the arrangement of the drums 24 and 26 to each other and shows that the transverse conveying drum 24 is composed of a cylindrical body 48 and conveying disks 50 fastened to it and arranged one above the other. The slope conveyor drum 26 is provided with a lower, cylindrical body 52 and an upper body 54 with a reduced diameter compared to the lower body 52. Conveyor disks 56, 58, and 60 with diameters reduced upward step by step are attached to the bodies 52 and 54. The axis of rotation 62 of the slope conveyor drum 26 is inclined at an angle of approximately 5° towards the transverse conveying drum 24.

Figure 3:
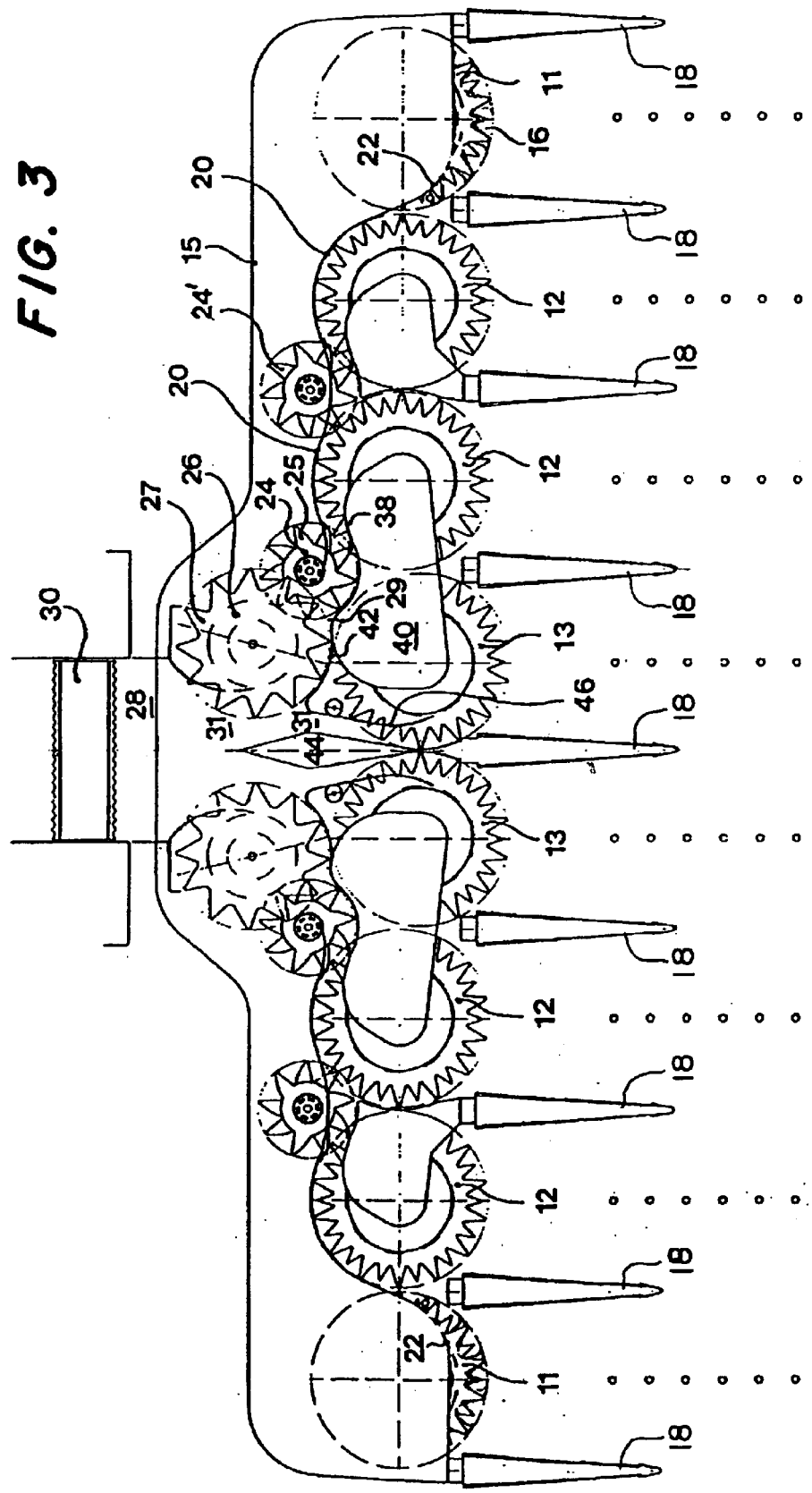
FIG. 3 is a second embodiment of the invention showing a header which has an enlarged width as compared to the header of FIG. 1.

The embodiment shown can be modified by the addition of intake and mowing drums 12 and transverse conveying drums 24 arranged in the valley region between adjacent intake and mowing drums 12 into an embodiment with the largest operating width, as is shown in FIG. 3.

Figure 4:
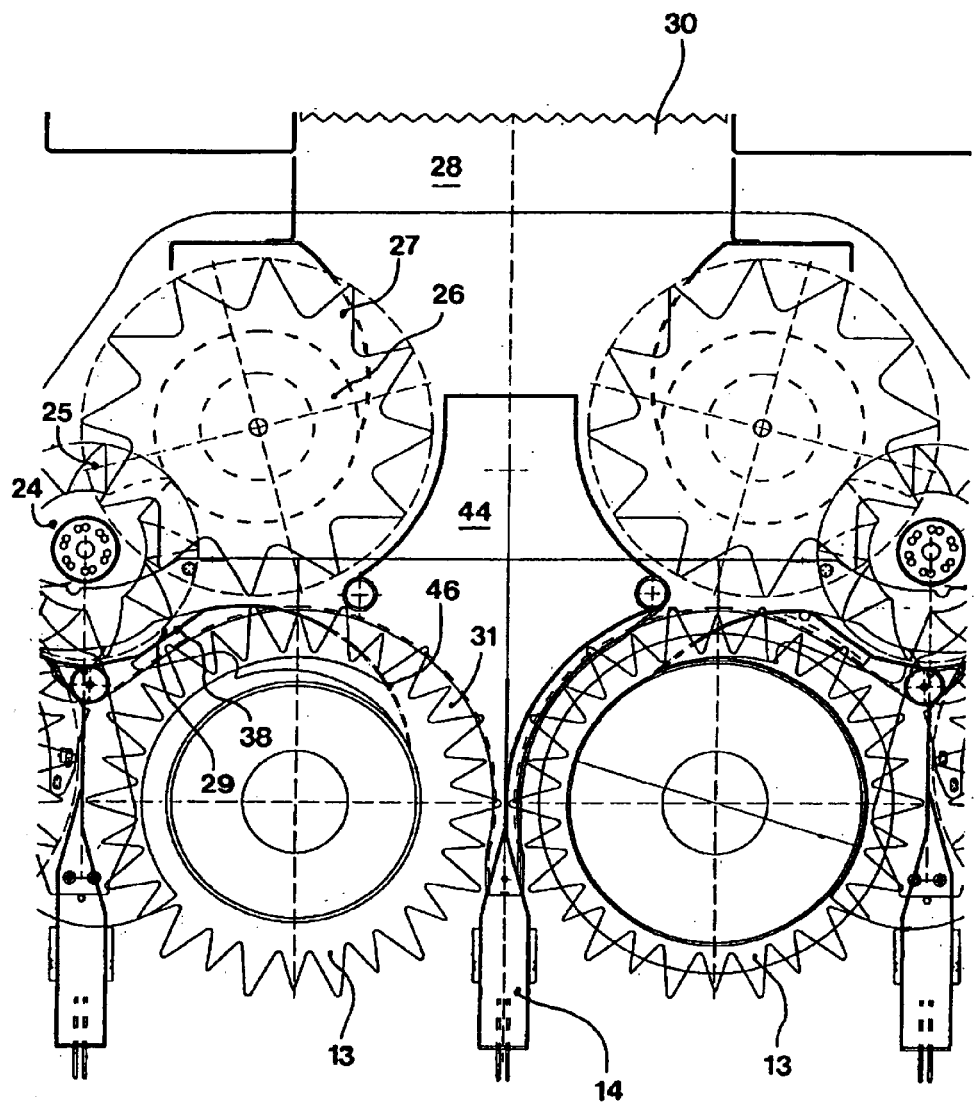
FIG. 4 is an enlarged plan view of the central region of a third embodiment of a crop harvester header for mowing stalk-like harvested crop

FIG. 4 shows a plan view of a central region of another embodiment of a crop harvesting header 10. Elements corresponding to other embodiments are identified with the same part number call-outs. While the intake and mowing drums 11, 12, 13 and the transverse conveying drums 24 and slope conveyor drums 26 agree in configuration and arrangement with the other embodiments, the take-out devices 46 of the inner intake and mowing drums 13 are arranged further outward (downstream) and the walls 42 are omitted. Thereby, the result is that the crop is transferred from the inner intake and mowing drums 13, somewhat behind their axes of rotation, to the slope conveyor drums 26. The transfer from the inner intake and mowing drums 13 to the slope conveyor drums 26 is performed downstream of the transfer from the transverse conveying drums 24 to the slope conveyor drums 26, which occurs at the downstream end of the wall 38. The guide elements 44 are wider and extend close to the valley regions between the inner intake and mowing drums 13 and the slope conveyor drums 26. In this embodiment, the crop is always conveyed actively in the conveying channels 29 and 31. The result is a flow of crop without any problems. The take-out devices 46 may extend more or less far forward, as can be seen on the basis of the different embodiments shown in the left and right parts of FIG. 4.

Having described the preferred embodiment, it will become apparent that various modifications can be made without departing from the scope of the invention as defined in the accompanying claims.

What is claimed is:

1. In a crop harvesting header including a body supporting a plurality of non-overlapping intake and mowing drums in spaced, side-by-side relationship to each other across the body for cutting and conveying crop at a first operating height toward a crop outlet defined by a fore-and-aft extending conveying channel centered along a fore-and-aft extending center plane of said header and located at a second operating height above said first operating height, a plurality of crop dividers projecting in a direction of forward travel at respective locations between adjacent pairs of said intake and mowing drums and one of said plurality of crop dividers being located along said center plane, said plurality of intake and mowing drums including, at least at one side of said center plane, an inner intake and mowing drum located adjacent said center plane and a second intake and mowing drum located next to, and at an opposite side of said inner intake and mowing drum from said center plane, said fore-and-aft extending conveying channel being located behind said inner and second intake and mowing drums, said second intake and mowing drum being adapted for being driven such that it conveys cut crop first outwardly of said plane and then rearwardly, a deflecting conveying unit being mounted for rotation about an upwardly and forwardly inclined axis and being mounted such that it bridges said first and second operating heights, the improvement comprising: said inner intake and mowing drum being driven such that it conveys cut harvested crop first inward toward said plane and then to the rear; and a crop conveying channel being located for receiving crop from said inner intake and mowing drum and defining an unobstructed straight path to said outlet.

2. The crop harvesting header, as defined in claim 1, wherein a transverse crop conveying channel is located behind, and separate from, said inner intake and mowing drum, but in crop-receiving communication with said second intake and mowing drum.

3. The crop harvesting header, as defined in claim 2, wherein said transverse crop conveying channel includes a vertical wall located outside an outer circumferential dimension of said inner intake and mowing drum.

4. The crop harvesting header, as defined in claim 1, and further including a transverse conveying drum located between said second intake and mowing drum and said deflecting conveying unit and is operable for taking harvested crop from said second intake and mowing drum and conducting such crop directly to said deflecting conveying unit.

5. The crop harvesting header, as defined in claim 4, wherein said deflecting conveying unit is positioned for receiving harvested crop from said inner intake and mowing drum at a location downstream of a region where it takes up crop from said second intake and mowing drum.

6. The crop harvesting header, as defined in claim 2, wherein said plurality of intake and mowing drums include an outer intake and mowing drum located further outward from said central plane than said second intake and mowing arrangement; and said outer intake and mowing drum being located and rotated for delivering crop to a rear side of said second intake and mowing drum whereby the latter serves to move said crop toward said center plane and to said transverse crop conveying channel.

7. The crop harvesting header, as defined in claim 1, wherein said inner intake and mowing drum is offset forwardly of said second intake and mowing arrangement.

8. The crop harvesting header, as defined in claim 1, wherein said header is symmetrical about said longitudinal center plane.

* * * * *